United States Patent
Yashiro et al.

(10) Patent No.: US 11,572,052 B2
(45) Date of Patent: Feb. 7, 2023

(54) VEHICLE CONTROL FOR FACILITATING CONTROL OF A VEHICLE PASSING A PRECECEDING VEHICLE

(71) Applicant: HONDA MOTOR CO., LTD., Tokyo (JP)

(72) Inventors: Katsuya Yashiro, Wako (JP); Ayumu Horiba, Wako (JP); Chihiro Oguro, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 16/924,249

(22) Filed: Jul. 9, 2020

(65) Prior Publication Data
US 2021/0009103 A1    Jan. 14, 2021

(30) Foreign Application Priority Data
Jul. 11, 2019   (JP) .............................. JP2019-129507

(51) Int. Cl.
*B60W 10/06* (2006.01)
*B60W 30/18* (2012.01)
*B60W 40/06* (2012.01)
*B60W 10/18* (2012.01)
*B60W 10/184* (2012.01)

(52) U.S. Cl.
CPC .......... *B60W 10/06* (2013.01); *B60W 10/184* (2013.01); *B60W 30/18163* (2013.01); *B60W 40/06* (2013.01)

(58) Field of Classification Search
CPC combination set(s) only.
See application file for complete search history.

(56) References Cited

U.S. PATENT DOCUMENTS

| | | | |
|---|---|---|---|
| 2017/0052540 A1* | 2/2017 | Lokesh | B60W 30/165 |
| 2017/0240176 A1* | 8/2017 | Aoki | B60W 40/04 |
| 2019/0054922 A1* | 2/2019 | Yalla | B60W 10/18 |

(Continued)

FOREIGN PATENT DOCUMENTS

| | | |
|---|---|---|
| JP | 2008-282235 | 11/2008 |
| JP | 2010-123021 | 6/2010 |
| JP | 2016-139281 | 8/2016 |

(Continued)

OTHER PUBLICATIONS

Japanese Office Action for Japanese Patent Application No. 2019-129507 dated Jun. 7, 2022.

*Primary Examiner* — Tyler J Lee
(74) *Attorney, Agent, or Firm* — Amin, Turocy & Watson, LLP

(57) ABSTRACT

A vehicle control device of an embodiment includes a recognizer configured to recognize a surrounding environment of a host vehicle and a driving controller configured to perform driving control by controlling one or both of a speed and steering of the host vehicle on the basis of a recognition result of the recognizer. In a case where a speed relationship between the host vehicle and a forward vehicle traveling in front of the host vehicle satisfies predetermined conditions, the driving controller is configured to perform passing control for passing the forward vehicle, and holds feature information of the forward vehicle under predetermined conditions.

10 Claims, 10 Drawing Sheets

(56) References Cited

U.S. PATENT DOCUMENTS

2020/0105142 A1* 4/2020 Miyakawa .......... G08G 1/0116

FOREIGN PATENT DOCUMENTS

| JP | 6103716 | 3/2017 |
| JP | 2018-112892 | 7/2018 |
| JP | 6394554 | 9/2018 |
| JP | 2018-195301 | 12/2018 |

* cited by examiner

FIG. 5

| LICENSE PLATE | VEHICLE MODEL | VEHICLE HEIGHT | VEHICLE WIDTH | PASSING TIME | PASSING POSITION |
|---|---|---|---|---|---|
| 12-34 | A | 160 | 200 | ** | ** |
| ** | ** | ** | ** | ** | ** |
| ** | ** | ** | ** | ** | ** |
| ⋮ | ⋮ | ⋮ | ⋮ | ⋮ | ⋮ |

182

VEHICLE CONTROL FOR FACILITATING CONTROL OF A VEHICLE PASSING A PRECECEDING VEHICLE

CROSS-REFERENCE TO RELATED APPLICATION

Priority is claimed on Japanese Patent Application No. 2019-129507, filed Jul. 11, 2019, the content of which is incorporated herein by reference.

BACKGROUND

Field of the Invention

The present invention relates to a vehicle control device, a vehicle control method, and a storage medium.

Description of Related Art

In recent years, there has been progress in research for automatic control of a vehicle. In connection with this, a technique for restricting passing travel in accordance with the traveling state of a following vehicle when passing is executed during automated driving, or performing control for returning to an original lane without passing a preceding vehicle even after a lane change has been performed for the purpose of passing is known (see, for example, Japanese Patent No. 6103716). A technique for determining whether there is a lane change is performed in accordance with whether a region of a size required for passing a preceding vehicle and then performing a lane change in front of the passed preceding vehicle is known (see, for example, Japanese Patent No. 6394554).

SUMMARY

However, in the related art, in a case where a host vehicle passes another preceding vehicle and then is passed by the other vehicle, and the other vehicle becomes a vehicle that precedes the host vehicle again, further passing control is executed in the host vehicle, and lane changes occur frequently in some cases.

One aspect of the present invention was contrived in view of such circumstances, and one object thereof is to provide a vehicle control device, a vehicle control method, and a storage medium that make it possible to prevent passing control of a preceding vehicle from being excessively performed.

A vehicle control device, a vehicle control method, and a storage medium according to this invention have the following configurations adopted therein.

(1) According to an aspect of this invention, there is provided a vehicle control device including: a recognizer configured to recognize a surrounding environment of a host vehicle; and a driving controller configured to perform driving control by controlling one or both of a speed and steering of the host vehicle on the basis of a recognition result of the recognizer, wherein, in a case where a speed relationship between the host vehicle and a forward vehicle traveling in front of the host vehicle satisfies predetermined conditions, the driving controller is configured to perform passing control for passing the forward vehicle, and holds feature information of the forward vehicle under predetermined conditions.

(2) In the vehicle control device according to the aspect of the above (1), in a case where feature information of another vehicle traveling in front of the host vehicle recognized by the recognizer and the held feature information of the forward vehicle which the host vehicle has passed in the past match each other and a degree of matching between the feature information of the another vehicle and the held feature information is a predetermined threshold or more, the driving controller performs suppression control for suppressing the passing control of the another vehicle.

(3) In the vehicle control device according to the aspect of the above (2), the driving controller performs the passing control in a case where a relative speed between the host vehicle and the another vehicle is a predetermined speed threshold or more, and in a case where the suppression control is performed, the driving controller sets the speed threshold to have a larger value than in a case where the suppression control is not performed.

(4) In the vehicle control device according to the aspect of the above (3), the driving controller performs the passing control in a case where a traveling state in which the relative speed is the speed threshold or more continues only for an interval of a predetermined distance threshold or more or a predetermined time threshold or more, and in a case where the suppression control is performed, the driving controller sets the distance threshold or the time threshold to have a larger value than in a case where the suppression control is not performed.

(5) In the vehicle control device according to any aspect of the above (2) to (4), in a case where the suppression control is performed, the driving controller performs the driving control to extend an inter-vehicle distance between the host vehicle and the another vehicle more than in a case where the suppression control is not performed.

(6) In the vehicle control device according to any aspect of the above (2) to (5), in a case where the suppression control is performed and control for returning the host vehicle in front of the another vehicle after passing the another vehicle is performed, the driving controller performs control for returning the host vehicle to extend an inter-vehicle distance between the host vehicle and the another vehicle more than in a case where the suppression control is not performed.

(7) In the vehicle control device according to any aspect of the above (2) to (6), in a case where a predetermined time has elapsed since the host vehicle has passed the another vehicle, the driving controller deletes the held feature information of the another vehicle, or releases the suppression control of the another vehicle.

(8) in the vehicle control device according to any aspect of the above (2) to (7), in a case where the host vehicle travels a predetermined distance after passing the another vehicle, the driving controller deletes the held feature information of the another vehicle, or releases the suppression control of the another vehicle.

(9) In the vehicle control device according to any aspect of the above (2) to (8), in a case where the host vehicle passes through a point which is set in advance, the driving controller deletes the held feature information, or releases the suppression control.

(10) In the vehicle control device according to any aspect of the above (2) to (9), in a case where a change in a speed specified by a travel environment of the host vehicle is detected, the driving controller deletes the held feature information, or releases the suppression control.

(11) According to another aspect of this invention, there is provided a vehicle control method including causing a computer of a vehicle control device to: recognize a surrounding environment of a host vehicle; and perform driving control by controlling one or both of a speed and steering of the host vehicle on the basis of a result of the recognition, and wherein, in a case where a speed relationship between the host vehicle and a forward vehicle traveling in front of the host vehicle satisfies predetermined conditions, the driving control is caused to perform passing control for passing the forward vehicle, and to hold feature information of the forward vehicle under predetermined conditions.

(12) According to another aspect of this invention, there is provided a computer readable non-transitory storage medium storing a program, the program causing a computer of a vehicle control device to: recognize a surrounding environment of a host vehicle; and perform driving control by controlling one or both of a speed and steering of the host vehicle on the basis of a result of the recognition, and wherein, in a case where a speed relationship between the host vehicle and a forward vehicle traveling in front of the host vehicle satisfies predetermined conditions, the driving control is caused to perform passing control for passing the forward vehicle, and to hold feature information of the forward vehicle under predetermined conditions.

According to the aspects of the above (1), (11), and (12), it is possible to prevent passing control of a preceding vehicle from being excessively performed by holding the feature information of the forward vehicle under predetermined conditions.

According to the aspect of the above (2), it is possible to prevent passing control from being excessively performed by performing suppression control for suppressing passing control.

According to the aspects of the above (3) and (4), it is possible to prevent inadvertent passing control from being operated while operating passing control at the time of need (such as the time of forward vehicle stop) even in a case where suppression control is performed.

According to the aspect of the above (5), it is possible to increase the possibility of another vehicle getting in between the host vehicle and the forward vehicle while suppressing passing control by extending an inter-vehicle distance.

According to the aspect of the above (6), it is possible to reduce a sense of unease involved in an operation of passing control with respect to a rearward vehicle by securing a large inter-vehicle distance.

According to the aspects of the above (7) and (8), it is possible to prevent passing control from being excessively suppressed by deleting unnecessary feature information or the like.

According to the aspect of the above (9), since it is assumed that a traveling situation changes by passing a point which is set in advance, it is possible to reset suppression control early and appropriately.

According to the aspect of the above (10), in a case where a travel environment speed (indicator speed or another vehicle speed) changes, it is possible to reset suppression control early and appropriately.

BRIEF DESCRIPTION OF THE DRAWINGS

FIG. 5 is a diagram showing an example of passing vehicle information stored in a storage.

DETAILED DESCRIPTION OF THE INVENTION

Hereinafter, an embodiment of a vehicle control device, a vehicle control method, and a storage medium of the present invention will be described with reference to the accompanying drawings. The vehicle control device of the embodiment is applied to, for example, an automated driving vehicle. The term "automated driving" refers to, for example, controlling one or both of the steering and acceleration or deceleration of a vehicle and executing driving control. Examples of the above-described driving control include driving control such as an adaptive cruise control system (ACC), a traffic jam pilot (TJP), auto lane changing (ALC), a collision mitigation brake system (CMBS), or a lane keeping assistance system (LKAS). The automated driving vehicle may be configured such that driving control based on manual driving of an occupant (a driver) is executed. A case where rules of left-hand traffic are applied will be described below, but in a case where rules of right-hand traffic are applied, the right and left may be interchanged. In the following description, one direction in a horizontal direction is defined as X, the other direction is defined as Y, and a vertical direction orthogonal to the horizontal direction of X-Y is defined as Z.

[Overall Configuration]

Figure 1:
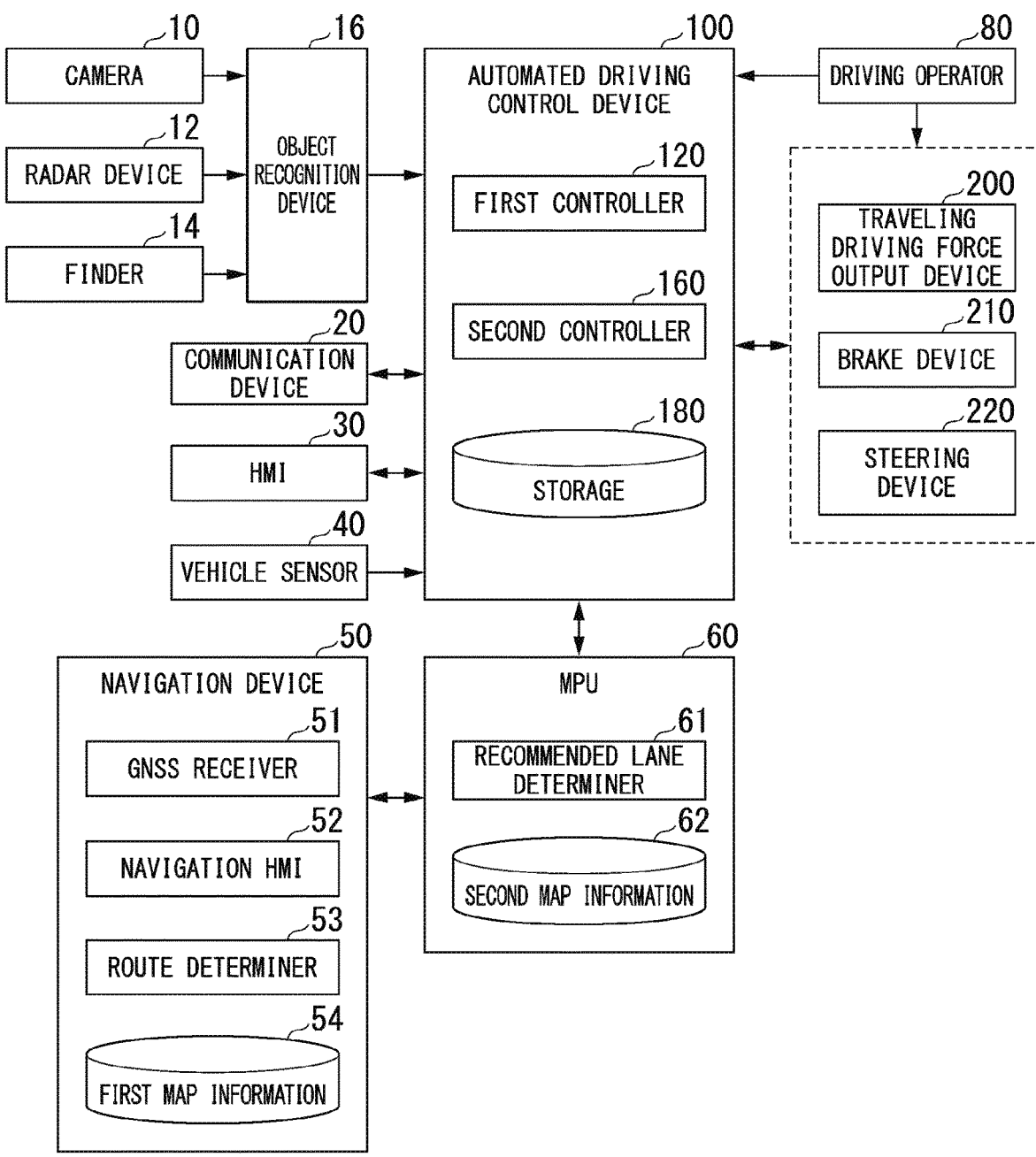
FIG. 1 is a configuration diagram of a vehicle system using a vehicle control device according to an embodiment.

FIG. 1 is a configuration diagram of a vehicle system 1 in which the vehicle control device according to the embodiment is used. A vehicle having the vehicle system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on the host vehicle M. For example, in a case where a forward image of the host vehicle M is captured, the camera 10 is installed on the upper portion of the front windshield, the rear surface of the rear-view mirror, or the like. In a case where a rearward image of the host vehicle M is captured, the camera 10 is installed on the upper portion of the rear windshield or the like. In a case where a rightward or leftward image of the host vehicle M is captured, the camera 10 is installed on the right side, left side or the like of the car body or the side mirror. The camera 10, for example, repeatedly captures an image of the vicinity of the host vehicle M periodically. The camera 10 may be a stereo camera.

The radar device 12 radiates radio waves such as millimeterwaves to the vicinity of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The finder 14 is a light detection and ranging (LIDAR) viewfinder. The finder 14 irradiates the vicinity of the host vehicle M with light, and measures scattered light. The finder 14 detects a distance to an object on the basis of a time from light emission to light reception. The irradiation light is, for example, pulsed laser light. The finder 14 is installed at any point on the host vehicle M.

The object recognition device 16 recognizes the position, type, speed, or the like of an object by performing a sensor fusion process on the results of detection performed by some or all of the camera 10, the radar device 12, and the finder 14. The object recognition device 16 outputs a recognition result to the automated driving control device 100. The object recognition device 16 may output the detection results of the camera 10, the radar device 12, and the finder 14, as they are, to the automated driving control device 100. In this case, the object recognition device 16 may be omitted from the vehicle system 1.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with various types of server devices through a wireless base station.

The HMI 30 presents various types of information to an occupant (including a driver) of the host vehicle M, and accepts the occupant's input operation. The HMI 30 includes, for example, various types of display devices, a speaker, a buzzer, a touch panel, a switch, a key, and the like. The HMI 30 may include, for example, a direction indicator for accepting the traveling direction of the host vehicle M according to the occupant's intention (operation).

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 has first map information 54 held in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 decides, for example, a route (hereinafter, a route on a map) from the position (or any input position) of the host vehicle M specified by the GNSS receiver 51 to a destination input by an occupant using the navigation HMI 52 with reference to the first map information 54.

The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and decides a recommended lane for each block with reference to the second map information 62. The recommended lane determiner 61 makes a decision on which lane from the left to travel along. In a case where a branch point is present in the route on a map, the recommended lane determiner 61 decides a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, a second controller 160, and a storage 180. The first controller 120 and the second controller 160 are realized by a hardware processor such as, for example, a central processing unit (CPU) (a computer) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device.

The storage 180 is realized by various types of storage devices described above. The storage 180 is realized by, for example, an HDD, a flash memory, an electrically erasable programmable read only memory (EEPROM), a read only memory (ROM), a random access memory (RAM), or the like. The storage 180 stores, for example, information such as passing vehicle information 182, in addition to a program which is read out and executed by a processor. The details of the passing vehicle information 182 will be described later.

Figure 2:
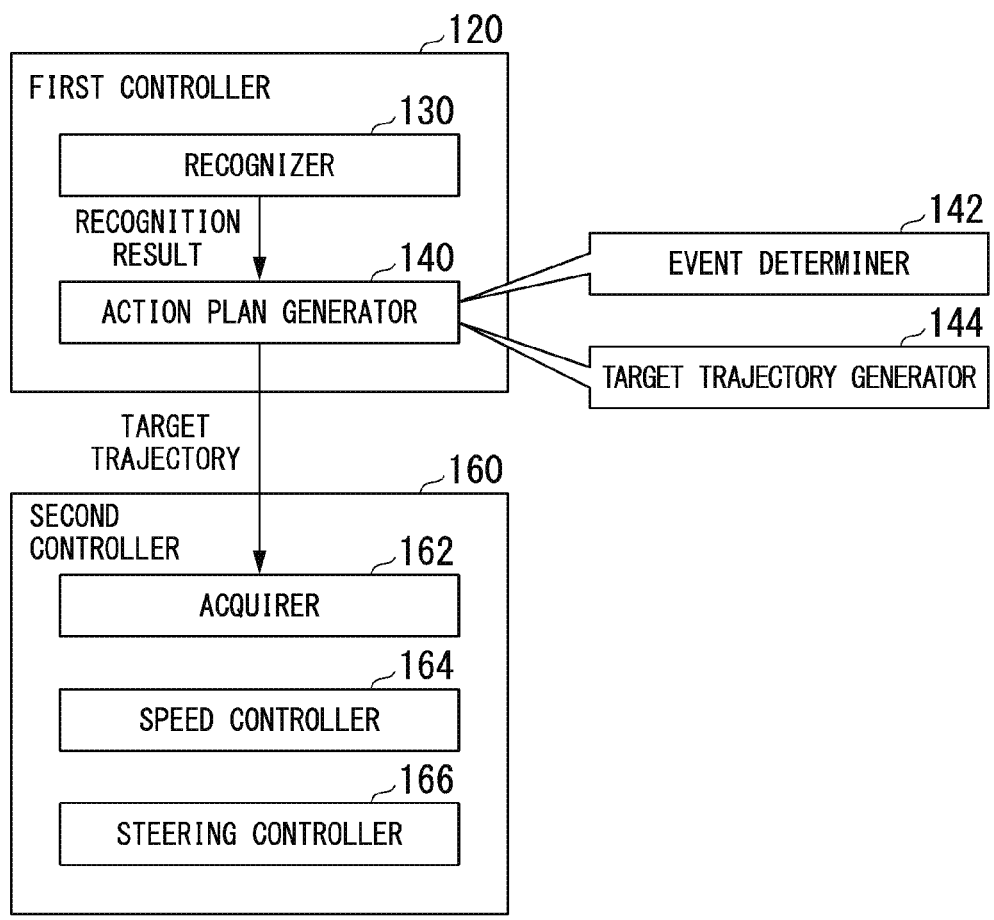
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. A combination of the action plan generator 140 and the second controller 160 is an example of a "driving controller."

The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and performing comprehensive evaluation by performing scoring on both. Thereby, the reliability of automated driving is secured.

The recognizer 130 recognizes the surrounding environment of the host vehicle M. For example, the recognizer 130 recognizes an object which is present in the periphery of the host vehicle M on the basis of information which is input from the camera 10, the radar device 12, and the finder 14 through the object recognition device 16. Examples of the object recognized by the recognizer 130 include a bicycle, an autobike, a four-wheeled automobile, a pedestrian, a road mark, a road sign, a partition line, a telephone pole, a guardrail, a fallen object, and the like. The recognizer 130 recognizes the state of the position, speed, acceleration or the like of an object. The position of the object is recognized as, for example, a position in relative coordinates (that is, a relative position with respect to the host vehicle M) with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a host lane in which the host vehicle M is traveling, an adjacent lane which is adjacent to the host lane, or the like. For example, the recognizer 130 recognizes the host lane, the adjacent lane, or the like by comparing a pattern of a road partition line (for example, an array of solid lines and broken lines) obtained from the second map information 62 with a pattern of a road partition line located in the vicinity of the host vehicle M which is recognized from an image captured by the camera 10.

The recognizer 130 is not limited to the road partition line, and may recognize lanes such as the host lane or the adjacent lane by recognizing a driving boundary (road boundary) including a road partition line, a shoulder, a curbstone, a median strip, a guardrail, or the like. In this recognition, the position of the host vehicle M acquired from the navigation device 50 or processing results based on an INS may be added. The recognizer 130 recognizes a stop line, an obstacle, a red light, a tollbooth, and other road events.

Upon recognizing a host lane, the recognizer 130 recognizes the relative position or posture of the host vehicle M with respect to the host lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the host lane. Instead, the recognizer 130 may recognize the position of the reference point of the host vehicle M or the like with respect to either lateral end portion (a road partition line or a road boundary) of the host lane as the relative position of the host vehicle M with respect to the host lane.

The action plan generator 140 includes, for example, an event determiner 142 and a target trajectory generator 144. In a case where the host vehicle M is performing automated driving along a route on which a recommended lane is determined, the event determiner 142 determines a traveling mode of the automated driving. In the following description, information in which a traveling mode of automated driving is specified is referred to as an event.

Examples of events include a constant-speed traveling event of causing the host vehicle M to travel in the same lane at a constant speed, a following traveling event of causing the host vehicle M to follow another vehicle (hereinafter referred to as a preceding vehicle mA) which is present within a predetermined distance (within, for example, 100 [m]) in front of the host vehicle M in the host lane and is closest to the host vehicle M, a lane change event of changing the lane of the host vehicle M from the host lane to an adjacent lane, a divergence event of causing the host vehicle M to diverge to a lane on the destination side at a divergence point of a road, a merging event of causing the host vehicle M to merge into a main line at a merging point, an overtaking event of terminating automated driving and switching the automated driving to manual driving, and the like. The term "following" may be, for example, a traveling mode of maintaining a constant inter-vehicle distance (relative distance) between the host vehicle M and the preceding vehicle mA, or may be a traveling mode causing the host vehicle M to travel in the center of the host lane in addition to maintaining a constant inter-vehicle distance between the host vehicle M and the preceding vehicle mA. Examples of the events may include a passing event of temporarily changing the lane of the host vehicle M to its adjacent lane, passing the preceding vehicle mA in the adjacent lane and then changing the lane to an original lane again, an avoidance event of causing the host vehicle M to perform at least one of braking and steering in order to avoid an obstacle which is present in front of the host vehicle M, and the like.

The event determiner 142 may change, for example, an event already decided with respect to the current section to another event in accordance with a peripheral situation recognized by the recognizer 130 during traveling of the host vehicle M, or may decide a new event with respect to the current section.

The event determiner 142 may change an event already decided with respect to the current section to another event in accordance with an occupant's operation of a vehicle-mounted instrument, or decide a new event with respect to the current section. For example, in a case where an occupant operates a direction indicator, the event determiner 142 may change the event already decided with respect to the current section to a lane change event, and newly decide a lane change event with respect to the current section.

For example, in a case where an occupant operates the lever (also referred to as a stoke or a switch) of a direction indicator for a predetermined time (for example, a few seconds) to indicate a lane change to an adjacent lane located on the left side, the event determiner 142 decides a lane change event of changing the lane of the host vehicle M to an adjacent lane located on the left side as seen from the host vehicle M. For example, in a case where an occupant operates the lever of a direction indicator to indicate a lane change to an adjacent lane located on the right side, the event determiner 142 decides a lane change event of changing the lane of the host vehicle M to an adjacent lane located on the right side as seen from the host vehicle M. Operating the lever of a direction indicator to indicate a lane change is also referred to as a single-touch function. In addition to or instead of operating the lever of a direction indicator, the indication of a lane change may be performed by operating a steering wheel, may be performed by inputting a voice to a microphone, or may be performed by operating another switch or button.

The target trajectory generator 144 generates a future target trajectory along which the host vehicle M is caused to travel automatically (irrespective of a driver's operation) in a traveling mode specified by an event so that the host vehicle M travels in a recommended lane decided by the recommended lane determiner 61 in principle and copes with its peripheral situation when the host vehicle M travels in the recommended lane. The target trajectory includes, for example, a position element for determining a future position of the host vehicle M and a speed element for determining a future speed or the like of the host vehicle M.

For example, the target trajectory generator 144 decides a plurality of points (trajectory points) at which the host vehicle M will arrive in order as position elements of a target trajectory. The trajectory points are points at which the host vehicle M will arrive after predetermined traveling distances (for example, approximately every several [m]). The predetermined traveling distances may be calculated by, for example, a distance along a road when advancing along a route.

The target trajectory generator 144 decides a target speed and a target acceleration for each predetermined sampling time (for example, several tenths of a [sec]) as speed elements of a target trajectory. The trajectory points may be positions at which the host vehicle M will arrive at sampling times for respective predetermined sampling times. In this case, the target speed or the target acceleration is decided by intervals between sampling times and trajectory points. The target trajectory generator 144 outputs information indicating the generated target trajectory to the second controller 160.

The second controller 160 controls the traveling driving force output device 200, the brake device 210, and the steering device 220 so that the host vehicle M passes along the target trajectory generated by the action plan generator 140 according to scheduled times.

The second controller 160 includes, for example, an acquirer 162, a speed controller 164, and a steering controller 166. The acquirer 162 acquires information of the target trajectory (trajectory point) generated by the action plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic controller (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Process Flow]

<Passing Control>

Hereinafter, a flow of a series of processes performed by the automated driving control device 100 according to the embodiment will be described with reference to a flow chart.

Figure 3:
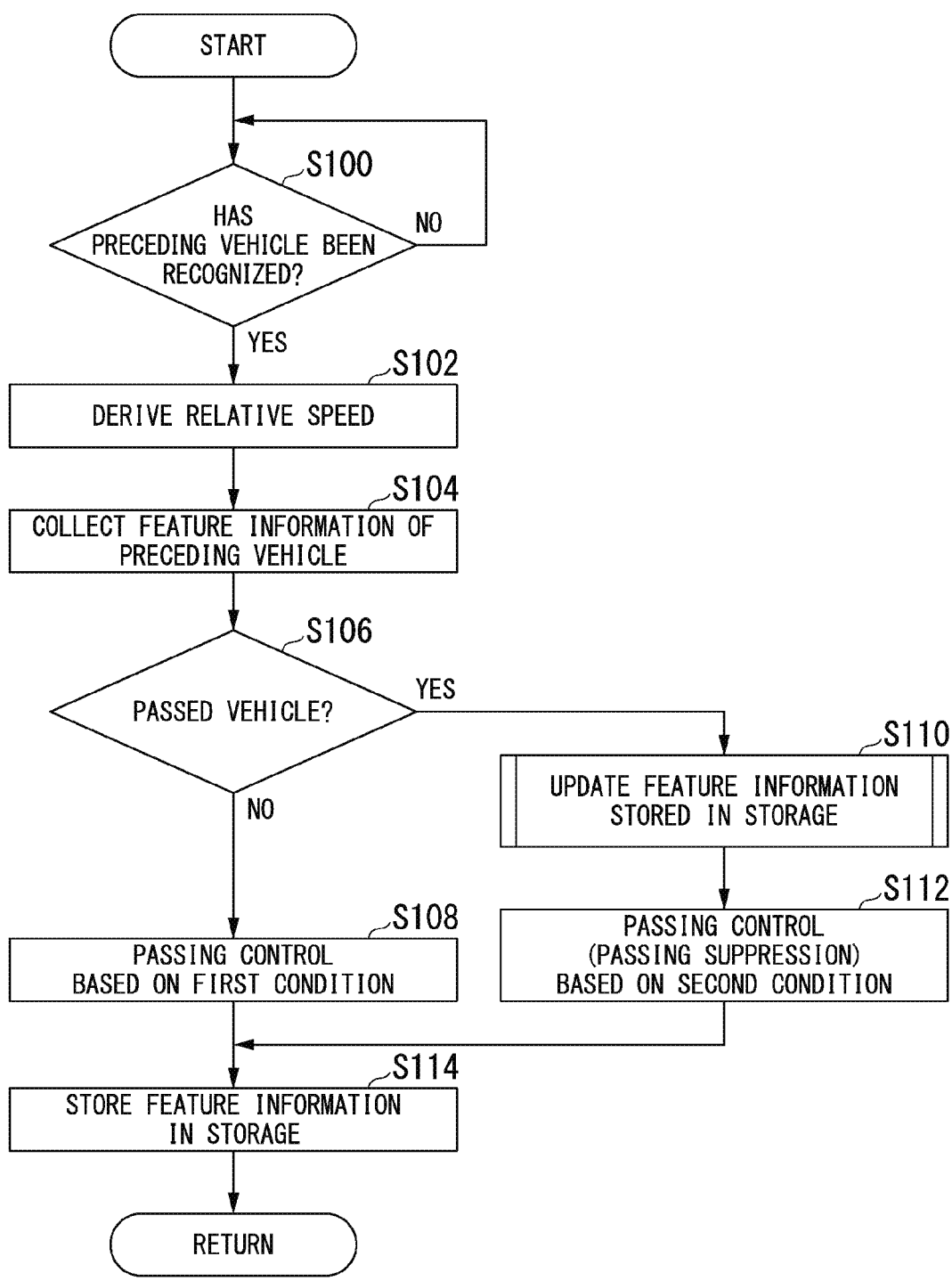
FIG. 3 is a flow chart showing a flow of a series of processes which are performed by an automated driving control device.

FIG. 3 is a flow chart showing a flow of a series of processes performed by the automated driving control device 100. The processing of the present flow chart may be repeatedly executed, for example, with a predetermined period during automated driving of the host vehicle M.

First, the action plan generator 140 stands by until the preceding vehicle mA is recognized by the recognizer 130 (step S100), and derives a relative speed Vr between the host vehicle M and the preceding vehicle mA in a case where the preceding vehicle mA is recognized by the recognizer 130 (step S102). The relative speed Vr is, for example, a speed difference obtained by subtracting the speed of the preceding vehicle mA from the speed of the host vehicle M.

Figure 4:
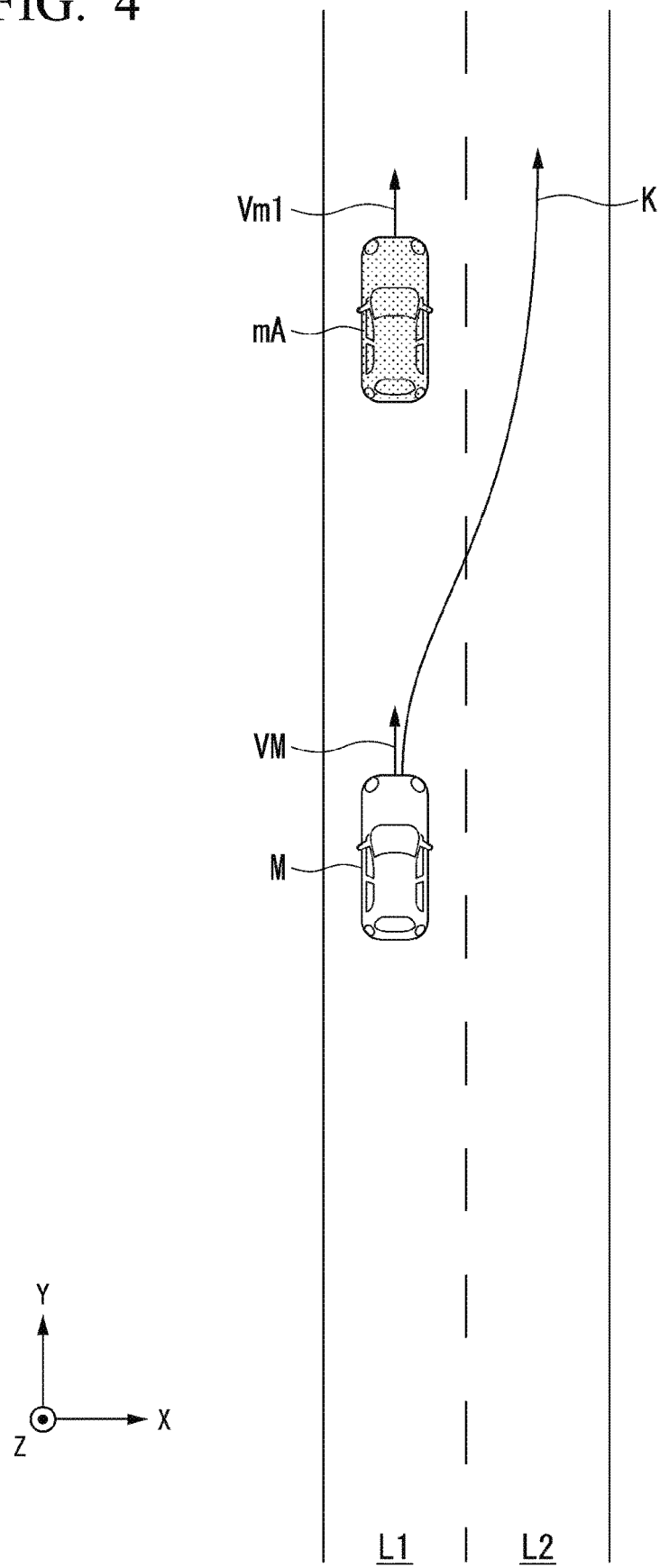
FIG. 4 is a diagram showing an example of a situation in which a host vehicle passes a preceding vehicle.

FIG. 4 is a diagram showing an example of a situation in which the host vehicle M passes the preceding vehicle mA. In FIG. 4, L1 and L2 represent lanes. The host vehicle M and the preceding vehicle mA are traveling in the lane L1. In a case where the preceding vehicle mA is recognized by the recognizer 130, the action plan generator 140 derives the relative speed Vr (=VM−Vm1) which is a speed difference obtained by subtracting the speed Vm1 of the preceding vehicle mA from the speed VM of the host vehicle M.

Next, the action plan generator 140 collects feature information of the preceding vehicle mA recognized by the recognizer 130 (step S104). The "feature information" is information for identifying the preceding vehicle mA. For example, the action plan generator 140 collects feature information such as a license plate attached to the rear of the preceding vehicle mA, the shape, dimensions, pattern, color, or number of a reflecting plate, a vehicle width, a vehicle height, and the color of a vehicle. The action plan generator 140 specifies the model of the preceding vehicle mA on the basis of the collected feature information. The vehicle model may indicate the classification of vehicle models such as an ordinary automobile, a small automobile, a medium automobile, or a large automobile in addition to the type of vehicle.

Next, the action plan generator 140 determines whether the preceding vehicle mA recognized by the recognizer 130 is a passed vehicle (step S106). The term "passed vehicle" refers to another vehicle that has been passed by the host vehicle M in an interval of a fixed period in the past and/or a fixed traveling distance. The action plan generator 140 determines whether the collected feature information of the preceding vehicle mA is included in the passing vehicle information 182 stored in the storage 180.

FIG. 5 is a diagram showing an example of the passing vehicle information 182 stored in the storage 180. The passing vehicle information 182 is feature information of another vehicle collected in the past, and includes feature information of another vehicle which has been passed by the host vehicle M (a passed vehicle). The action plan generator 140 determines whether information such as, for example, a "license plate," a "vehicle model," a "vehicle height," a "vehicle width," or the "color of a vehicle" included in the collected feature information of the preceding vehicle mA matches corresponding information included in the passing vehicle information 182 stored in the storage 180.

For example, in a case where the collected feature information of the preceding vehicle mA and the feature information included in the passing vehicle information 182 stored in the storage 180 match each other with a predetermined threshold or more, the action plan generator 140 determines that the preceding vehicle mA recognized by the recognizer 130 is a passed vehicle. For example, in a case where three or more of four items of a "license plate," a "vehicle model," a "vehicle height," and a "vehicle width" included in the collected feature information of the preceding vehicle mA match the feature information included in the passing vehicle information 182 stored in the storage 180, the action plan generator 140 determines that the preceding vehicle mA recognized by the recognizer 130 is a passed vehicle.

In a case where it is determined that the preceding vehicle mA is not a passed vehicle, the action plan generator 140 performs passing control based on a first condition (step S108). The first condition is a condition based on the relative speed Vr between the host vehicle M and the preceding vehicle mA. For example, the first condition includes that the relative speed Vr between the host vehicle M and the preceding vehicle mA is a certain threshold (hereinafter referred to as a first speed threshold ThV1) or more and that a traveling state in which the relative speed Vr is the first speed threshold ThV1 or more continues only for an interval of a certain distance threshold (hereinafter referred to as a first distance threshold ThD1) or more. Alternatively, the first condition includes that the relative speed Vr is the first speed threshold ThV1 or more and that a traveling state in which the relative speed Vr is the first speed threshold ThV1 or more continues only for an interval of a certain time threshold (hereinafter referred to as a first time threshold ThT1) or more. The first condition may include that, in addition to or instead of the relative speed Vr between the host vehicle M and the preceding vehicle mA being the first speed threshold ThV1 or more, the relative distance between the host vehicle M and the preceding vehicle mA is the threshold or more, or time-to-collision (TTC) obtained by dividing the relative distance between the host vehicle M and the preceding vehicle mA by the relative speed Vr between the host vehicle M and the preceding vehicle mA is the threshold or more.

For example, in a case where the first condition is satisfied, the action plan generator 140 decides an event in the current section as a passing event in order to pass the preceding vehicle mA, and generates a target trajectory K on the basis of the passing event. Upon receiving this, the second controller 160 causes the host vehicle M to pass the preceding vehicle mA by controlling the steering and speed of the host vehicle M on the basis of the target trajectory. The "passing" may also include "moving ahead" in which the host vehicle M moves ahead of the preceding vehicle mA without a lane change, in addition to the host vehicle M which is a following vehicle of the preceding vehicle mA performing a lane change from its host lane to an adjacent lane, moving ahead of the preceding vehicle mA in the adjacent lane, and then performing a lane change to the original lane.

On the other hand, in a case where it is determined that the preceding vehicle mA is a passed vehicle, the action plan generator 140 updates the feature information included in the passing vehicle information 182 stored in the storage 180 (step S110). A process of updating the feature information will be described later.

Next, the action plan generator 140 performs passing control based on a second condition (step S112). Similarly to the first condition, the second condition is a condition based on the relative speed Vr between the host vehicle M and the preceding vehicle mA. However, the second condition is a condition in which passing is suppressed as compared with the first condition. That is, the second condition includes that the relative speed Vr between the host vehicle M and the preceding vehicle mA is a certain threshold (hereinafter referred to as a second speed threshold ThV2) or more and that a traveling state in which the relative speed Vr is the second speed threshold ThV2 or more continues only for an interval of a certain distance threshold (hereinafter referred to as a second distance threshold ThD2) or more. Alternatively, the second condition includes that the relative speed Vr is the second speed threshold ThV2 or more and that a traveling state in which the relative speed Vr is the second speed threshold ThV2 or more continues only for an interval of a certain time threshold (hereinafter referred to as a second time threshold ThT2) or more. The second speed threshold ThV2 is larger than the first speed threshold ThV1. The second distance threshold ThD2 is larger than the first distance threshold ThD1. The second time threshold ThT2 is larger than the first time threshold ThT1. By setting the second speed threshold ThV2, the second distance threshold ThD2, and the second time threshold ThT2 in this manner, passing control can be executed (passing can be suppressed) only in a case where the relative speed Vr between the host vehicle M and the preceding vehicle mA is sufficiently high and the traveling state continues for a sufficiently long distance or time.

The second condition may include that, in addition to or instead of the relative speed Vr between the host vehicle M and the preceding vehicle mA being the second speed threshold ThV2 or more, the relative distance between the host vehicle M and the preceding vehicle mA is the threshold or more and that TTC obtained by dividing the relative distance between the host vehicle M and the preceding vehicle mA by the relative speed Vr between the host vehicle M and the preceding vehicle mA is the threshold or more.

For example, in a case where the second condition is satisfied, the action plan generator 140 decides an event in the current section as a passing event in order to pass the preceding vehicle mA, and generates a target trajectory K on the basis of the passing event. Upon receiving this, the second controller 160 causes the host vehicle M to pass the preceding vehicle mA by controlling the steering and speed of the host vehicle M on the basis of the target trajectory.

In the passing control based on the second condition, the action plan generator 140 performs control so as to extend an inter-vehicle distance at the time of following the preceding vehicle mA more than in the passing control based on the first condition.

Figure 6:
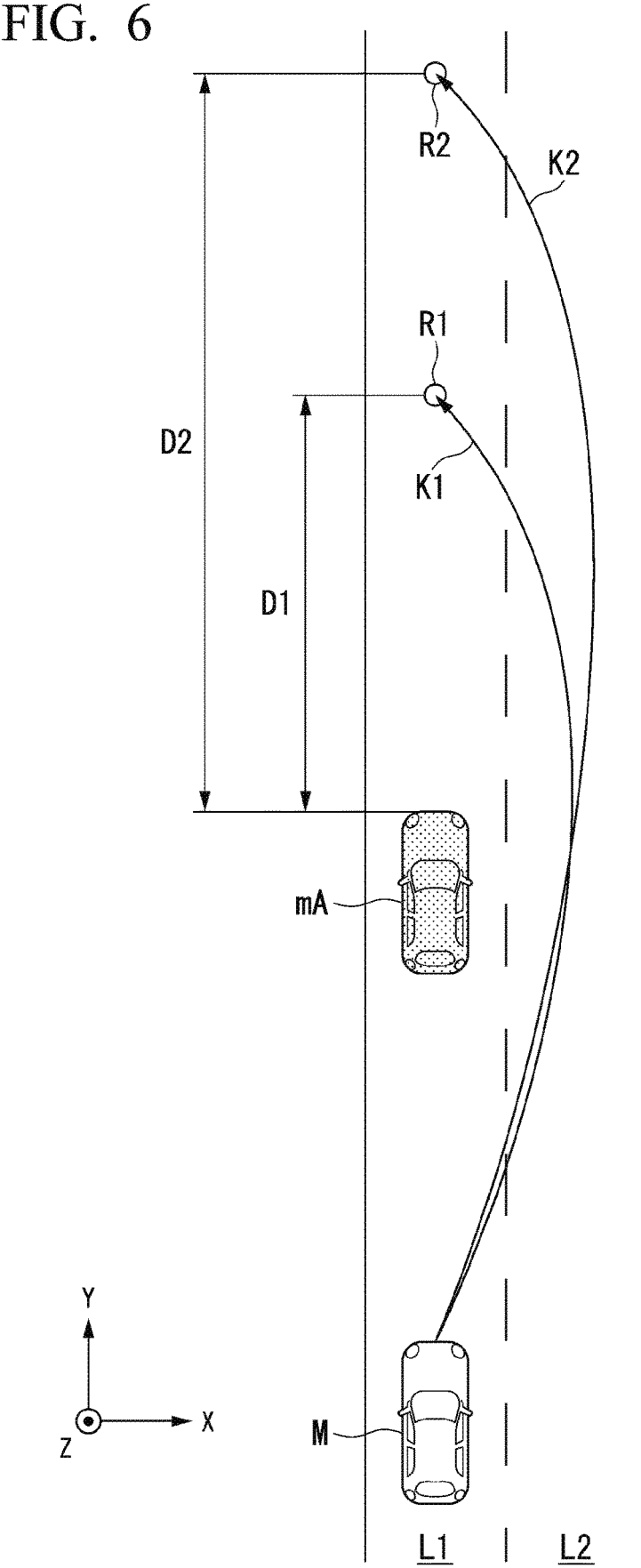
FIG. 6 is a diagram showing an example of a difference in a return position between a first condition and a second condition.

In the passing control based on the second condition, in a case where the host vehicle M returns to the original lane after passing the preceding vehicle mA, the action plan generator 140 sets a return position more distant from the preceding vehicle mA than in the passing control based on the first condition. FIG. 6 is a diagram showing an example of a difference in a return position between the first condition and the second condition. As shown in FIG. 6, the action plan generator 140 sets a return position R2 of a target trajectory K2 in the passing control based on the second condition to be more distant than a return position R1 of a target trajectory K1 in the passing control based on the first condition. That is, the action plan generator 140 sets an inter-vehicle distance D2 from the preceding vehicle mA (rearward vehicle) at the time of return to the original lane in the passing control based on the second condition to be larger than an inter-vehicle distance D1 from the preceding vehicle mA at the time of return to the original lane in the passing control based on the first condition (extends an inter-vehicle distance).

Figure 7:
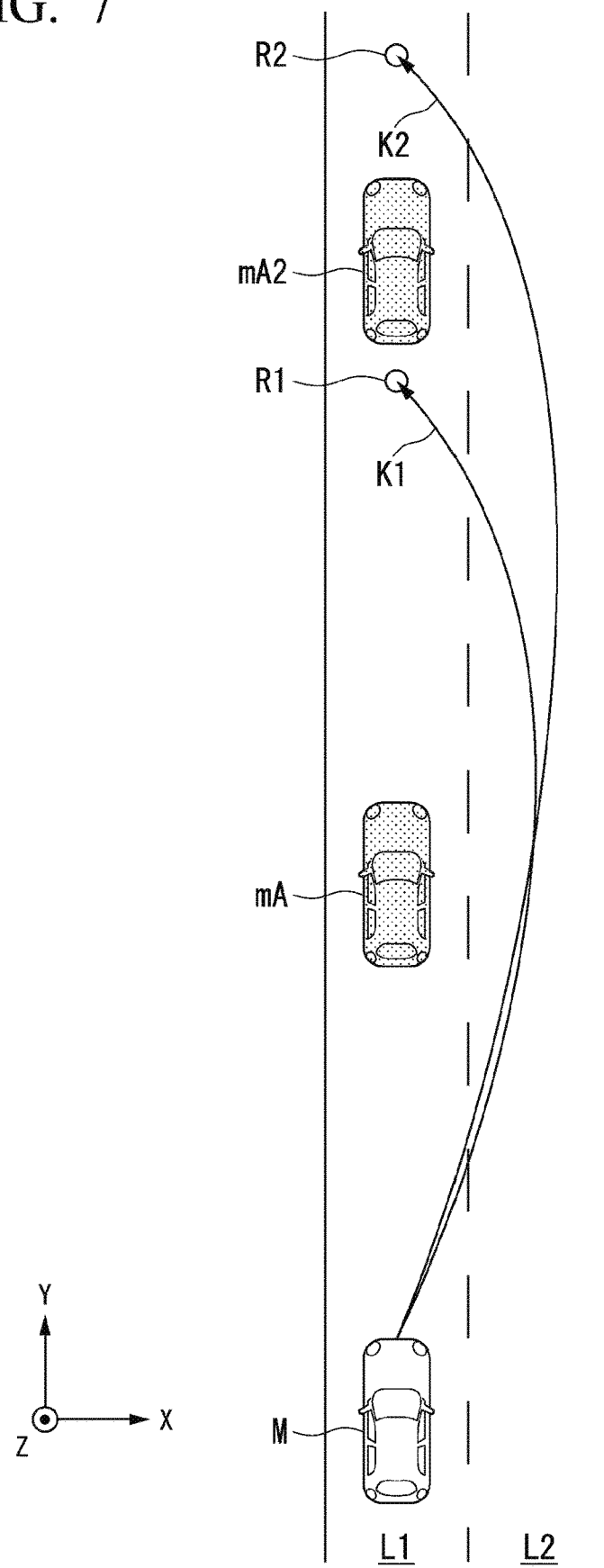
FIG. 7 is a diagram showing another example of a difference in a return position between the first condition and the second condition.

In the passing control based on the second condition, in a case where the host vehicle M returns to the original lane after passing the preceding vehicle mA, the action plan generator 140 may set a return position so that another vehicle different from the preceding vehicle mA which is a target for passing becomes a rearward vehicle of the host vehicle M. FIG. 7 is a diagram showing another example of a difference in a return position between the first condition and the second condition. As shown in FIG. 7, in the passing control based on the second condition, in a case where the host vehicle M returns to the original lane after passing the preceding vehicle mA, the action plan generator 140 may set a return position so that another vehicle mA2 located in front of the preceding vehicle mA which is a target for passing becomes a rearward vehicle of the host vehicle M (that is, returns in front of the other vehicle mA2).

In a case where it is determined that the first condition or the second condition is not satisfied, the action plan generator 140 maintains the current event with no change. For example, in a case where the current event is a following traveling event of causing the host vehicle M to follow the preceding vehicle mA, the second controller 160 controls at least the speed of the host vehicle M, and continues to cause the host vehicle M to follow the preceding vehicle mA.

Next, the action plan generator 140 stores feature information of the preceding vehicle mA (passed vehicle) that has been passed in the storage 180 (step S114). The action plan generator 140 may store all feature information of recognized preceding vehicles as well as the preceding vehicle mA that has been passed in the storage 180. This concludes the process of the present flow chart.

<Update Process of Feature Information>

Figure 8:
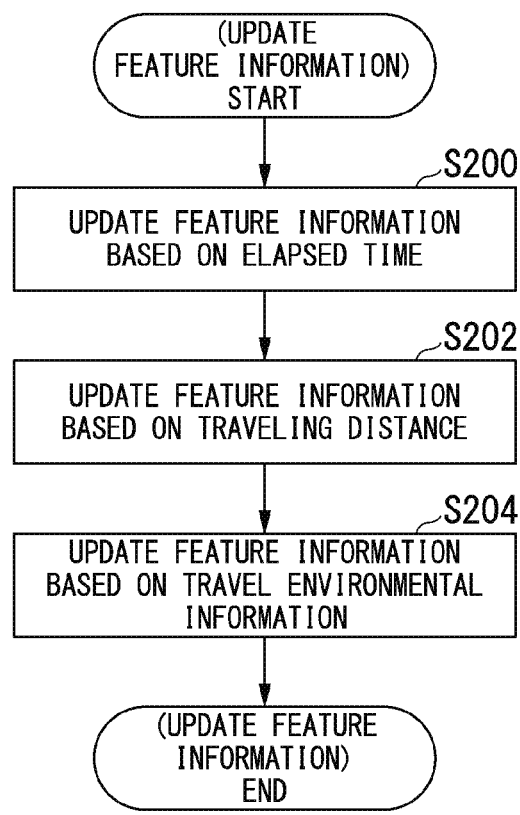
FIG. 8 is a flow chart showing an example of a flow of an update process of the passing vehicle information.

FIG. 8 is a flow chart showing an example of a flow of the update process of feature information (step S110) shown in FIG. 3.

First, the action plan generator 140 updates the feature information stored in the storage 180 on the basis of an elapsed time (step S200). The term "elapsed time" refers to a time that has elapsed since the host vehicle M passed the preceding vehicle mA. For example, the action plan generator 140 calculates an elapsed time of feature information for each vehicle by subtracting a "passing time" of feature information for each vehicle included in the passing vehicle information 182 stored in the storage 180 from the current time. The action plan generator 140 invalidates feature information in which the calculated elapsed time is a certain threshold or more (for example, an hour or more). Invalidating feature information involves deleting feature information, or associating predetermined information (flag) so that feature information becomes invalid. In this manner, by invalidating the feature information of the preceding vehicle mA in which a time has elapsed since passing, it is possible to release suppression control of the preceding vehicle mA, and to prevent passing control from being excessively suppressed.

Next, the action plan generator 140 updates the feature information stored in the storage 180 on the basis of a traveling distance (step S202). The term "traveling distance" refers to a distance for which the host vehicle M passes the preceding vehicle mA and then travels. For example, the action plan generator 140 calculates the traveling distance on the basis of the current position of the host vehicle M which is obtained from the navigation device 50 and the "passing position" of feature information for each vehicle which is included in the passing vehicle information 182 stored in the storage 180. The action plan generator 140 invalidates feature information in which the calculated traveling distance is a certain threshold or more (for example, 100 km or more). In this manner, by invalidating the feature information of the preceding vehicle mA in which the traveling distance has elapsed sufficiently since passing, it is possible to release suppression control of the preceding vehicle mA, and to prevent passing control from being excessively suppressed.

Next, the action plan generator 140 updates the feature information stored in the storage 180 on the basis of travel environmental information (step S204). The "travel environmental information" includes information indicating whether a point set in advance (for example, a junction (JCT), an interchange (IC), or a parking area (PA)) has been passed, information relating to the road upper limit speed of a travel environment, or the like.

For example, the action plan generator 140 determines whether the host vehicle M has passed through a point which is set in advance after passing the preceding vehicle mA on the basis of the current position of the host vehicle M which is obtained from the navigation device 50 and the "passing position" of feature information for each vehicle which is included in the passing vehicle information 182 stored in the storage 180. In a case where it is determined that the host vehicle M has passed through a point which is set in advance after passing the preceding vehicle mA, the action plan generator 140 invalidates the feature information of the preceding vehicle mA which is a target for this passing. In this manner, in a case where the host vehicle M has passed through a point which is set in advance, it is assumed that a traveling situation changes. By invalidating the feature information under such a situation, it is possible to reset passing vehicle information used in passing control early and appropriately.

For example, in a case where a road upper limit speed (indicator speed or another vehicle speed) in a travel environment at the current position of the host vehicle M obtained from the navigation device 50 and a road upper limit speed in a travel environment at the "passing position" of feature information for each vehicle included in the passing vehicle information 182 stored in the storage 180 are different from each other, the action plan generator 140 invalidates the feature information of the preceding vehicle mA which is a target for this passing. By invalidating the feature information under such a situation, it is possible to reset passing vehicle information used in passing control early and appropriately. This concludes the process of the present flow chart, and the flow returns to the process of FIG. 3.

According to the embodiment described above, it is possible to prevent passing control of a preceding vehicle from being excessively performed.

Figure 9:
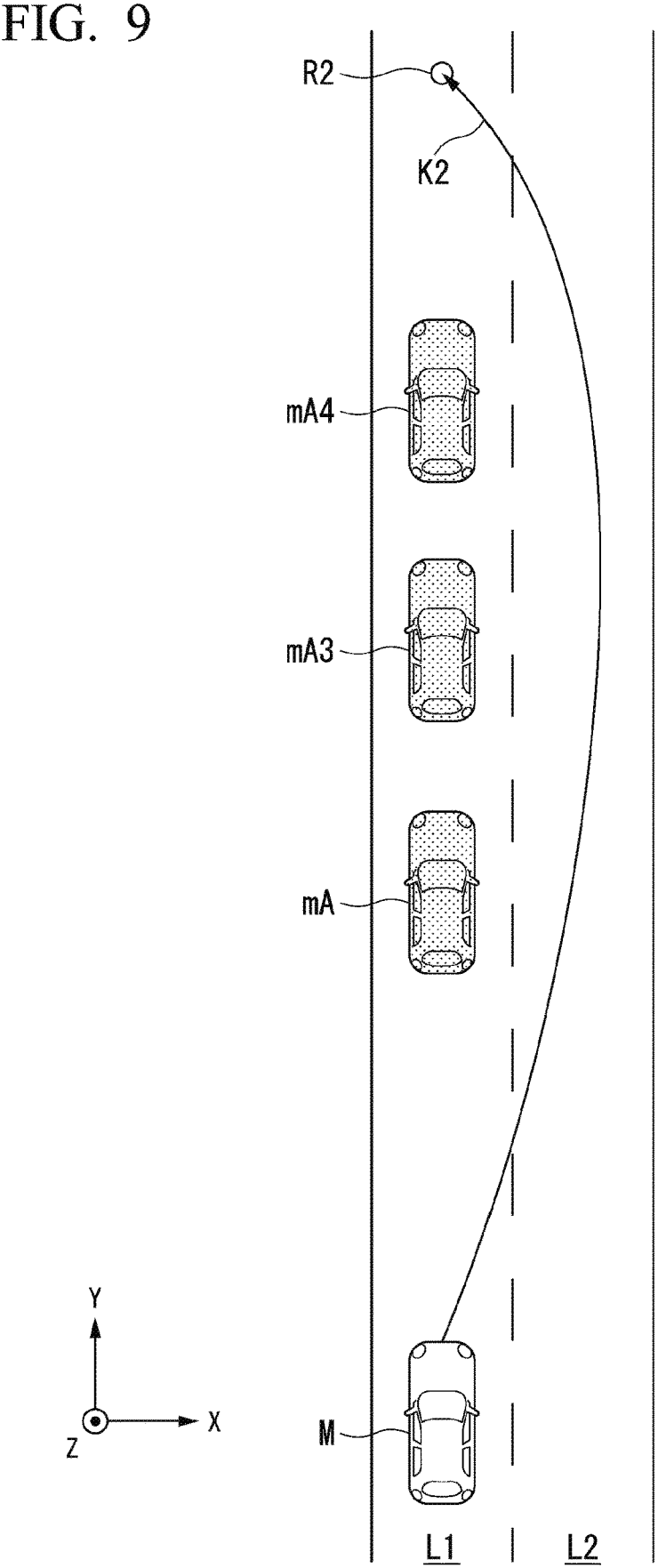
FIG. 9 is a diagram showing an example of a situation in which the host vehicle passes a plurality of preceding vehicles.

In the above embodiment, a description has been given by taking an example of a configuration in which the action plan generator 140 collects feature information of a forward vehicle traveling in front of the host vehicle M, but there is no limitation thereto. For example, as shown in FIG. 9, in a case where another vehicle mA3 is traveling in front of a forward vehicle mA, and another vehicle mA4 is traveling in front of the other vehicle mA3, the action plan generator 140 may collect feature information of the other vehicle mA3 and the other vehicle mA4 in addition to or instead of the forward vehicle mA.

[Hardware Configuration]

Figure 10:
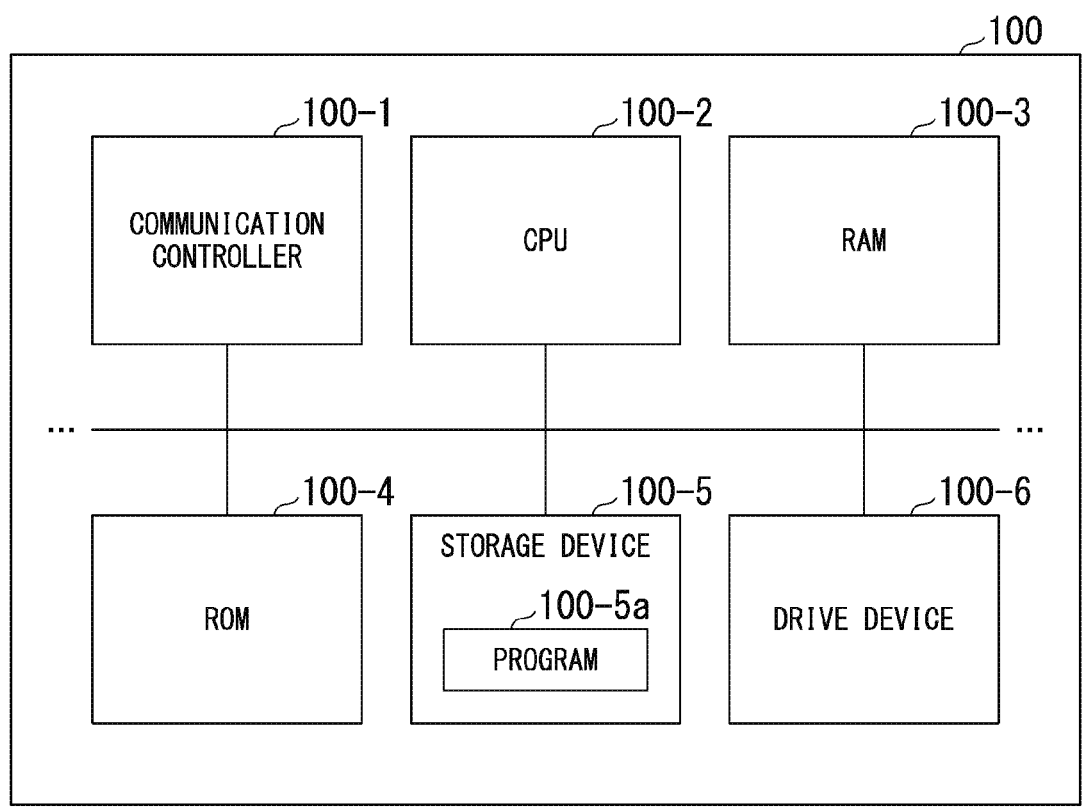
FIG. 10 is a diagram showing an example of a hardware configuration of the automated driving control device.

FIG. 10 is a diagram showing an example of a hardware configuration of the automated driving control device 100 of the embodiment. As shown in the drawing, the automated driving control device 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving control device 100. The storage device 100-5 stores a program 100-5a which is executed by the CPU 100-2. This program is developed into the RAM 100-3 by a direct memory access (DMA) controller (not shown) or the like, and is executed by the CPU 100-2. Thereby, some or all of the first controller 120 and the second controller 160 are realized.

The above-described embodiment can be represented as follows.

A vehicle control device including:

a storage device storing a program; and a hardware processor, wherein the hardware processor executes the program stored in the storage, to thereby recognize a surrounding environment of a host vehicle, and perform driving control by controlling one or both of a speed and steering of the host vehicle on the basis of a result of the recognition, and wherein, in a case where a speed relationship between the host vehicle and a forward vehicle traveling in front of the host vehicle satisfies predetermined conditions, the driving control is caused to perform passing control for passing the other vehicle, and to hold feature information of the forward vehicle under predetermined conditions.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a recognizer configured to recognize a surrounding environment of a host vehicle; and a driving controller configured to perform driving control by controlling one or both of a speed and steering of the host vehicle on the basis of a recognition result of the recognizer, wherein, in a case where a relative speed between the host vehicle and a forward vehicle traveling in front of the host vehicle is a speed threshold or more, the driving controller is configured to perform passing control for passing the forward vehicle, and hold feature information including a plurality of items for identifying the forward vehicle which has been passed by the host vehicle, wherein, in a case where each of a plurality of items of feature information of another vehicle traveling in front of the host vehicle recognized by the recognizer and each of the plurality of items of the held feature information of the forward vehicle which the host vehicle has passed in the past match each other and a degree of matching between the feature information of the another vehicle and the held feature information is a threshold or more, the driving controller performs suppression control for suppressing the passing control for passing the another vehicle, and wherein, in a case where the suppression control is performed, the driving controller sets the speed threshold to have a larger value than in a case where the suppression control is not performed.

2. The vehicle control device according to claim 1, wherein the driving controller performs the passing control in a case where a traveling state in which the relative speed is the speed threshold or more continues for a predetermined distance threshold or more or a predetermined time threshold or more, and in a case where the suppression control is performed, the driving controller sets the distance threshold or the time threshold to have a larger value than in a case where the suppression control is not performed.

3. The vehicle control device according to claim 1, wherein, in a case where the suppression control is performed, the driving controller performs the driving control to extend an inter-vehicle distance between the host vehicle and the another vehicle more than in a case where the suppression control is not performed.

4. The vehicle control device according to claim 1, wherein, in a case where the suppression control is performed and control for returning the host vehicle in front of the another vehicle after passing the another vehicle is performed, the driving controller performs control for returning the host vehicle to extend an inter-vehicle distance between the host vehicle and the another vehicle more than in a case where the suppression control is not performed.

5. The vehicle control device according to claim 1, wherein, in a case where a predetermined time has elapsed since the host vehicle has passed the another vehicle, the driving controller deletes the held feature information of the another vehicle, or releases the suppression control of the another vehicle.

6. The vehicle control device according to claim 1, wherein, in a case where the host vehicle travels a predetermined distance after passing the another vehicle, the driving controller deletes the held feature information of the another vehicle, or releases the suppression control of the another vehicle.

7. The vehicle control device according to claim 1, wherein, in a case where the host vehicle passes through a point which is set in advance, the driving controller deletes the held feature information, or releases the suppression control.

8. The vehicle control device according to claim 1, wherein, in a case where a change in a speed specified by a travel environment of the host vehicle is detected, the driving controller deletes the held feature information, or releases the suppression control.

9. A vehicle control method comprising causing a computer of a vehicle control device to:

recognize a surrounding environment of a host vehicle; and perform driving control by controlling one or both of a speed and steering of the host vehicle on the basis of a result of the recognition, wherein, in a case where a relative speed between the host vehicle and a forward vehicle traveling in front of the host vehicle is a speed threshold or more, the driving control is caused to perform passing control for passing the forward vehicle, and to hold feature information including a plurality of items for identifying the forward vehicle which has been passed by the host vehicle, wherein, in a case where each of a plurality of items of feature information of another vehicle traveling in front of the host vehicle and each of the plurality of items of the held feature information of the forward vehicle which the host vehicle has passed in the past match each other and a degree of matching between the feature information of the another vehicle and the held feature information is a threshold or more, the driving control is caused to perform suppression control for suppressing the passing control for passing the another vehicle, and wherein, in a case where the suppression control is performed, the driving control is caused to set the speed threshold to have a larger value than in a case where the suppression control is not performed.

10. A computer readable non-transitory storage medium storing a program, the program causing a computer of a vehicle control device to:

recognize a surrounding environment of a host vehicle; and perform driving control by controlling one or both of a speed and steering of the host vehicle on the basis of a result of the recognition, wherein, in a case where a relative speed between the host vehicle and a forward vehicle traveling in front of the host vehicle is at least a speed threshold, the driving control is caused to perform passing control for passing the forward vehicle, and to hold feature information including a plurality of items for identifying the forward vehicle which has been passed by the host vehicle, wherein, in a case where each of a plurality of items of feature information of another vehicle traveling in front of the host vehicle and each of the plurality of items of the held feature information of the forward vehicle which the host vehicle has passed in the past match each other and a degree of matching between the feature information of the another vehicle and the held feature information is a threshold or more, the driving control is caused to perform suppression control for suppressing the passing control for passing the another vehicle, and wherein, in a case where the suppression control is performed, the driving control is caused to set the speed threshold to have a larger value than in a case where the suppression control is not performed.

* * * * *